Aug. 12, 1952　　　S. DAILY ET AL　　　2,606,524
PIPE LINE MILKING SYSTEM
Filed April 15, 1949　　　2 SHEETS—SHEET 1
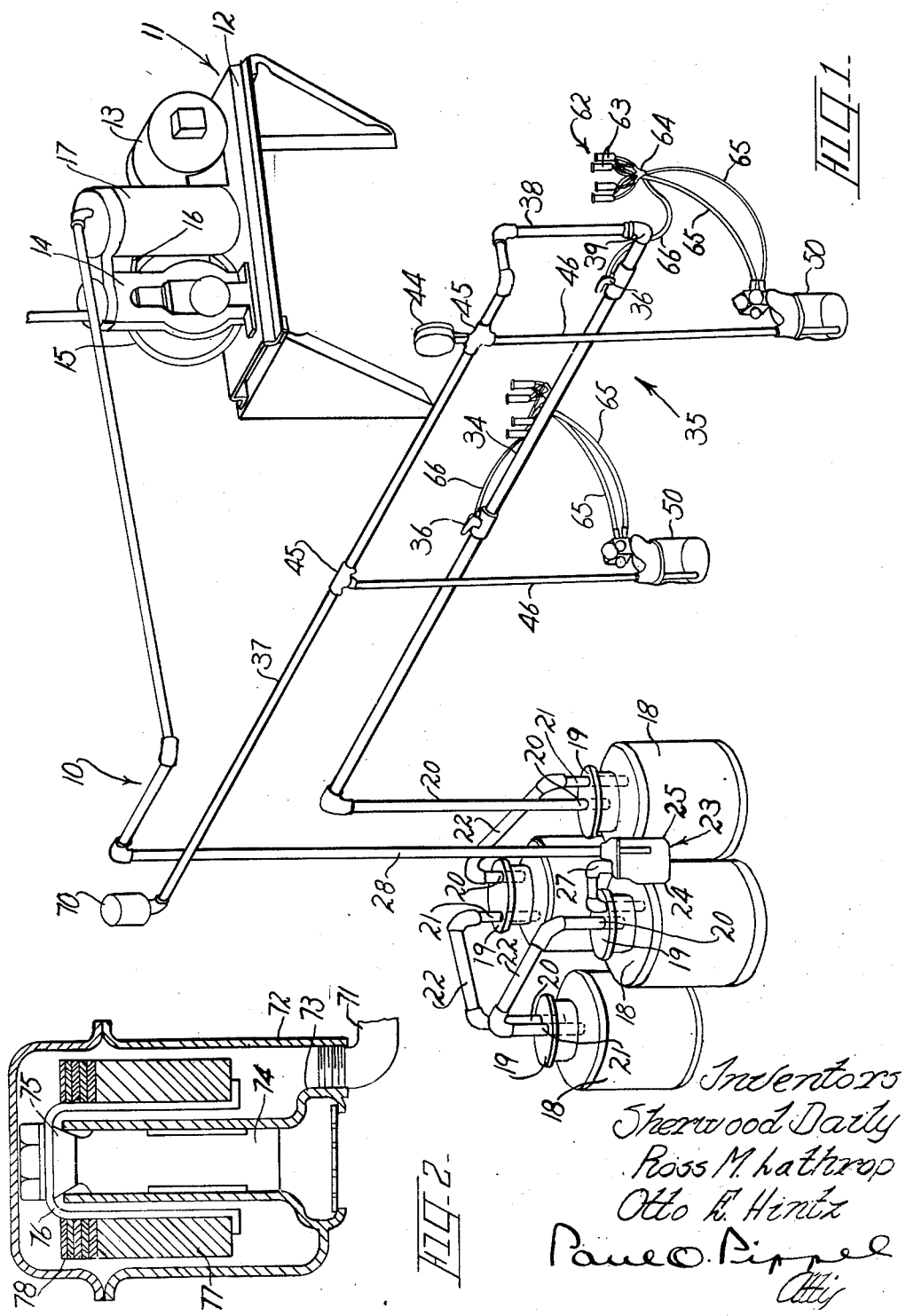
Inventors
Sherwood Daily
Ross M. Lathrop
Otto F. Hintz
Paul O. Pippel
Atty

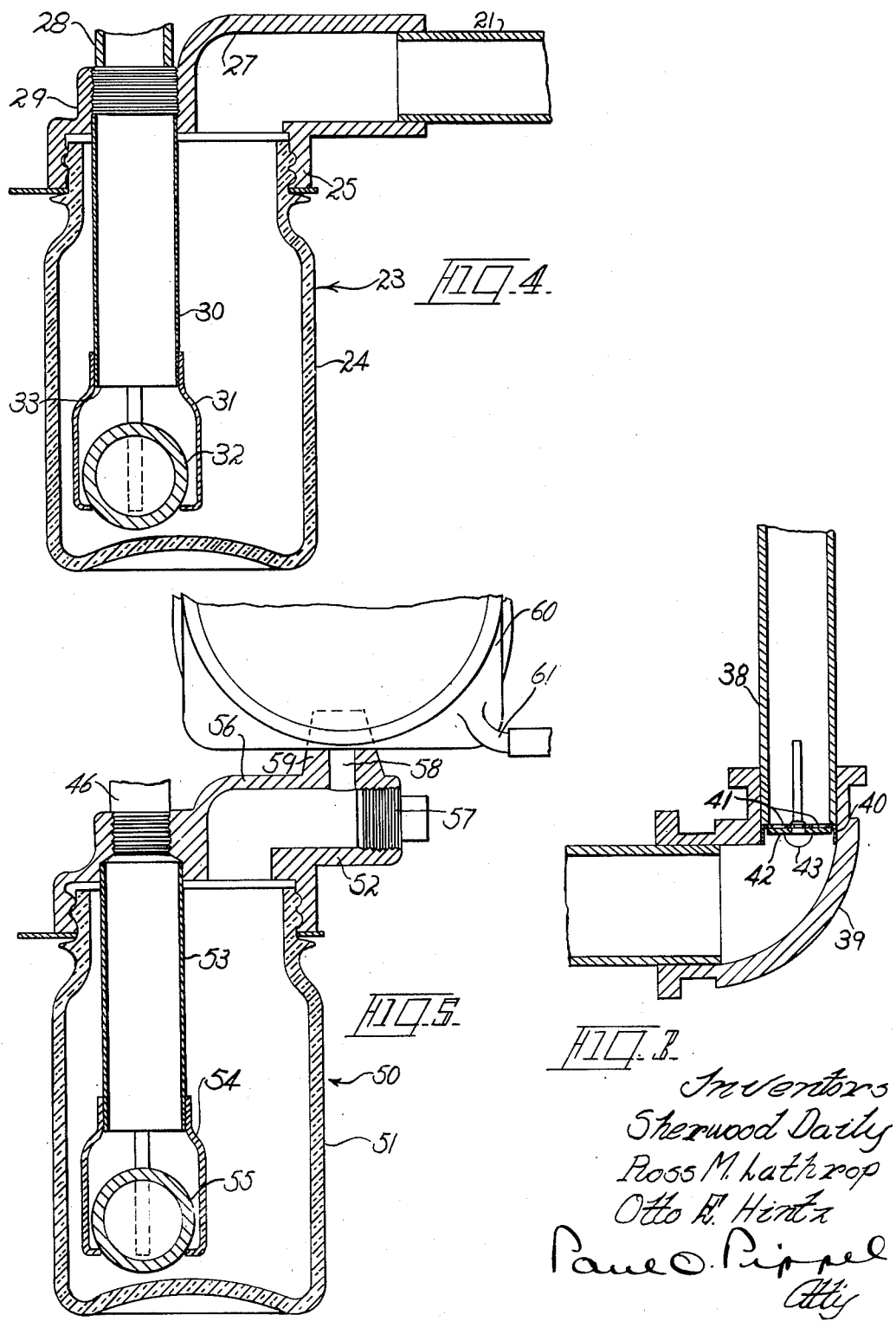

Patented Aug. 12, 1952

2,606,524

UNITED STATES PATENT OFFICE 2,606,524

PIPE LINE MILKING SYSTEM

Sherwood Daily, Downers Grove, Ross M. Lathrop, Oak Park, and Otto E. Hintz, Chicago, Ill., assignors to International Harvester Company, a corporation of New Jersey Application April 15, 1949, Serial No. 87,812

6 Claims. (Cl. 119—14.41)

This invention relates to an improved pipe line milking system wherein a herd of animals may be quickly and efficiently milked and the milk is directly delivered to a series of milk cans.

In conventional type milking systems the herd of animals is generally housed in a dairy barn. Each animal is provided with a stall and during the milking operation the operator moves the bucket type of milking machine from one stall to another until the operation is completed. Whenever a bucket type milking machine has been filled the cover of the milker pail is removed and the milk is poured into a conventional type of milk can, each can being individually handled during the operation. The pouring of the milk into each milk can, of course, subjects the milk to contamination by any bacteria which may be present in the atmosphere, and therefore problems of sanitation are presented.

In regions where the climate is relatively mild throughout the year, a more popular milking establishment has been the parlor or pipe line milker. The need for expensive dairy barns is dispensed with in such an establishment. The animals range and are bedded in the field, and when it is desired to milk them they are driven into an enclosure which usually contains one or more stalls wherein they are temporarily detained. An establishment of this type is more efficient and milking of the animals is quickly accomplished by means of a pipe line milking system. The milk procured in this manner is drawn from the animal by the usual type of milk pulsator in cooperation with a teat cup cluster which directs the milk directly to a milk supply conduit from which it is drawn under vacuum to a series of milk cans that are filled successively. The vacuum in the system is provided by means of a vacuum pump that may be directly connected to the milk can series. In order to secure a uniform vacuum pressure on each teat cup cluster it is of primary importance that any back pressures, surges, and resistance in the system be eliminated as much as possible. It is desirable to have a constant milk flow with a constant equal pressure on each teat cup of the cluster. It is applicants' prime object therefore to provide an improved pipe line milking arrangement which facilitates the removal of milk from the animals and the filling of the containers to which the milk is directed.

Another object is to provide a pipe line milking system having a vacuum source for creating a depression within a series of milk cans that are connected together, the milking system including a milk supply conduit connected to an air conduit, the air conduit having a vacuum regulating means for regulating the air supply to the supply conduit whereby air and milk simultaneously flow through the supply conduit to the milk cans and uneven vacuum pressures within the system are eliminated to a substantial degree.

Still another object is to provide an improved pipe line milking system including a supply conduit for supplying milk to a milk reservoir, the milk supply conduit being in communication with an air conduit which contains a vacuum regulator substantially remote from the vacuum pump and arranged to provide for even vacuum pressures at the point where the air conduit is connected to a pulsating unit.

A still further object is to provide a milk supply line for directing milk to a milk reservoir, the supply line being connected to an air line, the system having a one-way valve between the air line and the milk supply conduit, the valve permitting the flow of air to the milk conduit and being arranged to restrain the passage of liquid from the supply conduit upwardly into the air conduit.

A further object is to provide a pipe line milker arranged to fill a series of milk cans in succession, the milk cans being connected to a source of vacuum and having a milk supply line connected to the cans for delivering milk thereto, the milk supply line having communication with the air line and a pulsating device connected to the air line for supplying milk to the milk conduit.

A still further object is to provide an improved filling arrangement for filling a plurality of milk cans from a pipe line milking system, the arrangement including automatic shut-off means for shutting off the flow of milk to the cans when the last can is filled.

A still further object is to provide an improved condensation and liquid trap for automatically shutting off the operation of a pulsating unit connected to a pipe line milking system, the liquid trap being effective to stop the flow of vacuum to the pulsator upon the entrance of liquids into the trap.

These and other objects will become more readily apparent from a reading of the description when examined in connection with the accompanying drawings.

In the drawings:

Fig. 1 is a perspective view showing an improved pipe line milking system.

Fig. 2 is an enlarged cross-sectional view through a vacuum regulating unit included in the system shown in Fig. 1.

Fig. 3 is a detail enlarged cross-sectional view through a one-way valve positioned between an air conduit and a milk supply conduit as utilized in a pipe line milking system shown in Fig. 1.

Fig. 4 is an enlarged cross-sectional view through a liquid trap adapted for connection to the last can of a series of milk cans.

Fig. 5 is an enlarged cross-sectional view through a liquid trap adapted to mount a pulsating mechanism.

Referring specifically to Fig. 1, a pipe line milking system is generally designated by the reference character 10. The milking system 10 is shown in perspective and the arrangement shown is suitable for positioning in a milking parlor or barn of a type wherein the animals are temporarily housed during the milking operation. The view of the system has been shown in somewhat schematic form with the walls and structure of the milking barn, not shown, in order to clarify the disclosure.

A source of vacuum is generally designated by the reference character 11 and includes a support 12 on which an electric motor 13 is positioned. A pump 14 is carried by the support 12 and the pump is actuated by means of a fly wheel 15 which is driven by means of a belt 16 suitably connected to the electric motor 13. The arrangement herein is disclosed in the patent to Floyd G. Hodsdon, 1,964,515, patented June 26, 1934. A vacuum tank 17 is connected to the pump 14.

A plurality of milk cans are positioned in series. Each can includes a filling header or closure member 19 which is provided with a milk inlet connection or coupling 20. An outlet connection 21 is also positioned on the closure 19 of each milk can 18. The milk cans 18 are connected in series by means of a plurality of short sections of tubing 22. Each tubing has one end connected to the outlet connection 21 of one closure 19 and has its other end connected to the inlet connection 20 of the succeeding closure 19. The outlet connection 21 of the last can of the series is connected to a container or trap generally designated by the reference character 23 as best shown in Figs. 1 and 4. The container 23 consists primarily of a glass jar 24 having a cover 25 for sealing the same. The cover 25 is provided with a fitting 27 which is in communication with the outlet conduit 21 of the last can of the series. A vacuum conduit 28 is connected to the vacuum tank 17. The conduit 28 is in turn connected to a threaded bore 29 formed in the cover 25. A tubular extension 30 extends downwardly from the threaded bore 29 into the glass jar 24. The tubular extension is open at the bottom and has connected thereto a plurality of spaced fingers 31 which extend downwardly adjacent to the bottom of the glass jar 24. The fingers 31 have their lower ends bent inwardly to provide a seat for a rubber sphere or check valve 32. The check valve 32 is adapted to seat upwardly against the opening 33 for closing the same during the entrance and rise of liquid into the jar 24.

A milk supply conduit 34 is connected to the inlet connection 20 of the first can 18 of the series. The supply conduit 34 extends longitudinally adjacent to one or more milking stations 35 which are generally designated. The milking stations 35 are usually provided in the form of temporary retaining stalls for the animals during the milking operation. The milk supply conduit 34 is provided with a plurality of conventional type milk inlets in the form of pet cock connections which are positioned at each milking station 35. An air conduit or line 37 extends in parallel relation with respect to the conduit 34 and is connected thereto by means of a vertically extending pipe 38. The pipe 38 has at its lower end an elbow 39 which as best shown in Fig. 3 contains a one-way valve structure 40. The valve structure 40 is provided with a plurality of valve openings 41 which are adapted to be regulated by means of a flexible valve member 42 which is centrally riveted as indicated at 43 to the valve structure 40.

The air line 37 is provided with a conventional type of vacuum gauge 44 which is connected to one of a plurality of T-fittings 45. The fittings 45 are positioned adjacent the milking stations 35 and each fitting has a vertically extending riser pipe 46 connected thereto. Each riser pipe 46 is constructed to support a liquid trap or container 50. As best shown in Fig. 5 each trap 50 includes a glass jar 51 which is provided at its upper end with a closure member 52. The closure member 52 is provided with a downwardly extending tubular member 53 which terminates near the lower end of the glass jar 51. The tubular extension 53 is provided at its lower end with a plurality of downwardly extending spaced fingers 54 which have their lower ends bent inwardly to provide the seat for a rubber sphere or check valve 55. The rubber sphere 55 is adapted to engage the open end of the tubular extension 53 for sealing the same during the rise of liquid within the jar 51.

The cover 52 is provided with an elbow connection 56 which is closed at one end by means of a plug 57. The connection 56 also includes an upwardly extending bore 58 formed in a mounting boss 59. A pulsating unit 60 is supported by the mounting boss 59 in a well-known conventional manner and is in communication with the interior of the jar 51 by means of the bore 58. A pulsating unit of a type that may readily be utilized with the present system is shown in the Floyd G. Hodsdon Patent 2,129,765 which was patented September 13, 1938. The pulsating unit 60 includes a plurality of air tube connections 61 only one of which is shown in Fig. 5. A conventional type of teat cup cluster 62 is positioned adjacent each milking station 35. Each teat cup cluster 62 includes a plurality of teat cups 63 which are in communication with a milker claw 64. A milker claw of the type which may readily be used with the present arrangement is shown in the Floyd G. Hodsdon Patent 2,204,677 patented June 18, 1940. Each milker claw has a pair of air tubes 65 connected to the connections 61 of the pulsator 60. A milk tube 66 is also connected to each teat cup cluster 64 at one end, the other end of the tube 66 being connected to each pet cock 36 for supplying milk to the milk conduit 34.

The air conduit 37 has connected at one end a vacuum regulator 70. The vacuum regulator 70 is best shown in the sectional view of Fig. 2. The regulator 70 may be of conventional design and construction, the present unit being shown for the purpose of disclosure. The regulator consists of an elbow fitting 71 which connects the regulator to the air line 37. The air line 37 is in communication with the interior of a casing 72 having an upwardly extending centrally located tube 73. The tube 73 is open at its lower end and in communication with the atmosphere. The upper end of the tube 73 is adapted to provide a valve seat. A valve slide 74 is adapted to reciprocate within the tube 73. The valve slide 74 has connected at its upper end a valve 75 adapted to engage the upper end of the tube 73 for regulating the flow of air through the tube. The valve 75 has a hair-pin type of support 76 connected thereto. The support 76 is constructed to support a permanent weight 77 and a plurality of removable weights 78 which may readily be removed or replaced to regulate the action of the regulator.

It is not believed necessary to describe in detail the operation of the pulsating units 60, the teat cup clusters 62, and the vacuum pump 14 since a complete description is set forth in the above mentioned patents. Any conventional types of operating units may be utilized where other such units are capable of being placed in the novel arrangement shown.

In the operation the vacuum pump 14, by means of the conduit 28, creates a vacuum depression within the milk cans 18. A vacuum depression is also created in the milk supply line 34 and the air line 37. When the vacuum depression within the conduit 37 exceeds a predetermined vacuum pressure as indicated by the indicator 44, the vacuum regulator 70 functions to admit air to the system thereby lowering the depression therein. When the desired vacuum pressure is exceeded the hair pin support 76 is moved upwardly unseating the valve 75 from the upwardly extending tube 73. Thus it can be seen that air may enter into the casing and into the air line 37. By adding or subtracting weights 78 from the regulator the same may be controlled so that a desired vacuum pressure is maintained in the system at all times.

The riser pipes 46 are in communication with the traps 50 which are also under vacuum pressure. Since each pulsator 60 is in communication with a trap 50, the pulsator begins to pulsate intermittently providing for vacuum pulsations within the teat cups 63 of the teat cup cluster 62. The tubes 66 which are attached to the milk supply line 34 are also under vacuum and draw milk from the animal to the supply line. The milk thereupon flows from the supply line 34 to the milk cans 18. The milk cans 18 are so arranged that the cans are filled in succession. When the first can has been filled the liquid flows through the outlet connection 21 through the tube 22 and through the inlet connection 20 into the next can of the series. This operation continues until all the cans are filled. The jar 24 is transparent and thereupon any overflow of milk into the jar will be quickly seen by the operator whereupon he can manually shut off the system. However, the check valve 32 is effective to stop the operation of the system in the event that the overflow is not noticed. As the milk enters into the jar 24 the liquid level therein rises and the sphere 32 floats upwardly into engagement with the opening 33 of the tube 30 whereupon the vacuum connection 28 is shut off. The vacuum in the system therefore is substantially destroyed and milk will no longer flow to the milk supply line 34. Likewise the pulsating units 60 are stopped and the system becomes inoperative. Thus automatic means is provided for regulating the system when the series of milk cans has been filled.

The position of the vacuum regulator 70 with respect to the remainder of the system is of prime importance. It can be seen that the vacuum regulator 70 is positioned at the end of the air line 37 and thus is substantially close or in proximity to the milking stations 35. It is of prime importance that the vacuum at the pulsating units is controlled and regulated so that a constant and equal vacuum pressure exists at these particular locations. The vacuum regulator itself may usually be located in a dust-free room of the milk parlor. It allows the air to enter and maintain a constant vacuum at the milking stations of the system. In this manner the vacuum that draws the milk from the cow is always constant irrespective of whether the first or last can of the series is being filled. The milk supply line 34 is of somewhat larger diameter than the air line 37 and the vertical pipe 38. Thus the vacuum depression within the cans 18 causes the milk to flow toward the cans. Simultaneously a stream of air is drawn inwardly through the vacuum regulator 70 and this stream of air is drawn to the milk supply line 34 wherein it provides a continuous flow with the milk to the milk cans. The vacuum within the supply line 34 is thus effectively regulated and resistance and back pressures which might normally be present in the line, if the line were completely blocked with milk are eliminated. Thus also a constant vacuum suction on the teat cup cluster can be maintained.

The one-way valve structure 40 permits the air from the air line 37 to readily pass into the milk supply conduit 34. The valve member 42, however, is arranged to prevent the return of any fluid upwardly into the vertical pipe 38 and the air line 37. Thus milk during back pressure is prevented from entering into the air line 37. When the milking operation has been finished it is desirable to wash the milk supply line 34. The liquid is thereupon introduced into the supply line 34, and by virtue of the one-way valve structure 40 the liquid is prevented from entering into the air line 37.

The traps 50 provided at each station 35 are arranged to collect condensation which might be present in the risers 46 and in the air line 37. Likewise the traps 50 are positioned to collect any milk that might enter into the pulsator due to a cracked teat cup inflation. It is extremely desirable that condensation or other undesirable fluids be retained in the trap so that they cannot enter into the milk supply line. Thus when such fluids rise within the jar 51 the sphere 55 is moved upwardly against the open end of the tube 53 whereupon the vacuum connection between the riser pipe 46 and the interior of the jar 51 is eliminated. Since the vacuum flow is stopped the pulsator 60 which is connected to the particular trap being filled stops its operation and thus the flow of milk ceases to the milk supply line 34. In this manner an effective means is provided for automatically stopping each individual pulsating unit as an undesirable condition arises. In a system wherein a number of milking stations are utilized, it can readily be seen that any malfunction at one station will not cause an interruption of the milking operation at the other stations.

It can now be seen that a novel improved pipe line milking system has been provided, the novel positioning and arrangement of the various components being such that an efficient and sanitary milking system for parlor milkers is provided.

It must be understood that various modifications and changes may be made in the arrangement which do not depart from the spirit of the invention as disclosed nor the scope thereof as defined in the appended claims.

What is claimed is:

1. For a milking machine arrangement having a source of vacuum, a source of milk, and receiving means for receiving the milk; a piping system for delivering milk from the source to the receiving means comprising, a vacuum conduit connected to the source of vacuum and the receiving means for placing said receiving means under a vacuum depression, a milk delivery line connected at one end to said receiving means, an air conduit connected to the other end of said milk delivery line, said air conduit being adapted to communicate with the atmosphere, a one-way check valve between the air conduit and the milk delivery line, and means connecting the milk delivery line to the source of milk whereby milk is drawn to the receiving means by the vacuum depression in said receiving means and in said delivery line, said check valve being arranged to open toward the delivery line whereby air in the air conduit passes to the delivery line and is drawn concurrently with the milk toward said receiving means.

2. For a milking machine arrangement having a source of vacuum, a source of milk, and receiving means for receiving the milk; a piping system for delivering milk from the source to the receiving means comprising, a vacuum conduit connected to the receiving means and to the vacuum source to provide a vacuum depression in said receiving means, a milk delivery line connected to said receiving means, an air conduit connected to the milk delivery line, said air conduit having regulating means for opening the conduit to the atmosphere during a predetermined vacuum depression within the air conduit and the milk delivery line, and a check valve between the air conduit and the milk delivery line, the check valve being arranged to automatically open during a depression within the delivery line whereby air and milk are concurrently drawn to the receiving means, said valve being arranged to automatically close during the absence of a vacuum depression within the milk delivery line.

3. For a milking system having a source of vacuum, and receiving means for receiving the milk; a piping arrangement for delivering milk from the animal to the receiving means comprising a vacuum connection between the receiving means and the source of vacuum to provide a vacuum depression within the receiving means, a milk delivery line connected to the receiving means, an air conduit connected to said milk delivery line, said conduit including a regulating means arranged to open the conduit to the atmosphere during a predetermined vacuum depression therein, a one-way check valve between the air conduit and the delivery line, a pulsator connecting conduit connected to the air conduit, a pulsating unit in communication with said connecting conduit, and means connected to said milk delivery line for continuously delivering milk directly from the animal to said milk delivery line.

4. For a milking system having a source of vacuum, and receiving means for receiving the milk; a piping arrangement for delivering milk from the animal to the receiving means comprising a vacuum connection between the receiving means and the source of vacuum to provide a vacuum depression within the receiving means, a milk delivery line connected to the receiving means, an air conduit connected to said milk delivery line, said air conduit including a regulating means arranged to open the conduit to the atmosphere during a predetermined vacuum depression therein, a pulsator connecting conduit connected to the air conduit, a pulsating unit in communication with said connecting conduit, and means connected to said milk delivery line for continuously delivering milk directly from the animal to said milk delivery line.

5. For a milking system including a source of vacuum, milk receiving means, and a milking machine having a pulsating unit connected to a plurality of teat cups; a piping arrangement for delivering milk from the animal to the receiving means comprising a vacuum connection between the receiving means and the source of vacuum to provide a vacuum depression within the receiving means, a milk delivery line connected to the receiving means, an air conduit connected to said milk delivery line, a vacuum regulator connected to said air conduit, a one-way check valve between the air conduit and the delivery line, a vacuum conduit connected to the air conduit, means for connecting the vacuum conduit to the pulsating unit, and means continuously delivering milk from the teat cups to the milk delivery line.

6. For a milking system including a source of vacuum, milk receiving means, and a milking machine having a pulsating unit connected to a plurality of teat cups; a piping arrangement for delivering milk from the animal to the receiving means comprising a vacuum connection between the receiving means and the source of vacuum to provide a vacuum depression within the receiving means, a milk delivery line connected to the receiving means, an air conduit connected to said milk delivery line, a vacuum regulator connected to said air conduit, a vacuum conduit connected to the air conduit, means for connecting the vacuum conduit to the pulsating unit, and means continuously delivering milk from the teat cups to the milk delivery line.

SHERWOOD DAILY.
ROSS M. LATHROP.
OTTO E. HINTZ.

REFERENCES CITED

The following references are of record in the file of this patent:

UNITED STATES PATENTS

| Number | Name | Date |
|---|---|---|
| 594,860 | Cushman | Dec. 7, 1897 |
| 737,669 | Sharples | Sept. 1, 1903 |
| 1,548,827 | Daysh | Aug. 11, 1925 |
| 1,559,315 | Daysh | Oct. 27, 1925 |
| 2,006,393 | Hapgood | July 2, 1935 |
| 2,009,399 | Hapgood | July 30, 1935 |
| 2,037,467 | Hapgood | Apr. 14, 1936 |
| 2,380,771 | McDonald | July 31, 1945 |

FOREIGN PATENTS

| Number | Country | Date |
|---|---|---|
| 4,461 | Great Britain | Mar. 2, 1894 |